Patented May 16, 1933

1,909,819

UNITED STATES PATENT OFFICE

EDWARD CORNELL EMANUEL, OF LANCASTER, PENNSYLVANIA, ASSIGNOR TO ARM-
STRONG CORK COMPANY, OF LANCASTER, PENNSYLVANIA, A CORPORATION OF
PENNSYLVANIA

COATING FOR MOLDS AND METHOD OF COATING MOLDS THEREWITH

No Drawing.  Application filed December 1, 1932. Serial No. 645,241.

My invention relates to a coating for molds and a method of coating molds therewith and more particularly to an organic coating which upon carbonization forms a soft, smooth velvet-like coating and permits ready removal of the molded pieces. It imparts to the surface of the molded pieces a smooth surface. My invention also relates to a method of coating molds which results in a fine, smooth, uniformly deposited carbonized coating.

It has been proposed to use powdered soapstone or lamp black as a mold coating but such coatings have been found lacking. They are objectionable because they fill the building in which the casting is being done with the fine powder or soot. The molten metal flowing into the molds gathers up the dust as it flows and, as a consequence, the coating is removed from certain portions of the mold and the pieces cling thereto and are only difficulty removable therefrom.

It has also been proposed to use sodium silicate bound coatings with inorganic as well as organic bases. Sodium silicate retains water very tenaciously due to its hygroscopic nature and tends to deteriorate the mold when it is not in continuous use. The coating is not permanent and must be renewed quite frequently. It also cracks under the heat of the molten metal used to form the molded object.

It is an object of my invention to provide a coating for molds which adheres tenaciously to the mold surface and produces a soft, velvety coating which permits ready removal of the molded pieces. It is a further object of my invention to provide a coating which does not crack under heat and is relatively permanent; 100 or more moldings being obtained with a single application of my coating composition. My composition is particularly suited for use in the coating of molds which are of complicated contour and for fine molding work such as storage battery grids and the intricate zinc castings used in the automotive industry.

According to my invention, I provide a mold coating using, in my preferred form, finely divided cork as the base. Natural cork contains a fair amount of resinous material which is somewhat volatile in nature and which forms a highly satisfactory binder or adhesive upon its exusion under heat. Cork is cellular in structure, and due to this characteristic it is an efficient heat insulator. I take advantage of the resins inherent in the cork and employ them in a whole or in part as a binder for securing the cork to the mold thus forming a very efficient mold coating upon carbonization.

In order to expose a fairly large amount of resinous material, the cork is preferably finely ground. Good results have been obtained by using cork which is ground to what is commercially known as 80 to dust. The cork may be ground considerably finer and good results will be obtained. A typical screen analysis of 80 to dust cork is as follows:

| Screen mesh | Amount retained on screen |
|---|---|
| 80 | 3% |
| 100 | 1% |
| 150 | 7% |
| 170 | 75% |
| 200 | 4% |
| Dust | 5% |

The volatile constituents of the resin are evolved therefrom under heat. The evolution starts at about 250° F. At a slightly higher temperature the resins are exuded from the cork. The cork begins to char at about 250° F., and a temperature of about 500° to 1000° F. will reduce the cork to a cellular carbon. This cellular cork carbon has good insulating properties and serves to prevent the metal from cooling too rapidly and prevents the molded metal from adhering to the mold surface.

It is desirable, especially where the molded article is of a complicated nature, to apply the coating by means of an air gun. This necessitates that the cork be finely ground and be preferably mixed with a suitable vehicle in order to permit ready application. The dry powdered cork can, of course, be sprayed but not as successfully as when a vehicle is used.

In order that my invention may be more readily understood, I will describe a specific embodiment thereof. I take 100 parts by volume of 80 to dust cork and stir it into 200 parts by volume of water. After a thorough mixing, the material is placed into a suitable tank connected to a spraying apparatus. The material is sprayed onto the mold surface; the water acting solely as a vehicle for carrying the cork and for holding it in position on the mold until such time as the cork resins are utilized as the binder. The coated mold is then heated to drive off the water and volatile matter and exude the resinous material. This may be conveniently carried out by placing the coated mold in a suitable oven heated to about 750° F. The cork is carbonized at this temperature and the resins are exuded and firmly attach the individual cork granules to the mold surface. The carbonized cork forms an even, soft, cellular coating which is quite permanent. The coated mold may be immediately used for molding the desired pieces. When carbonized cork is employed as above described, the molded pieces may be removed from the mold after cooling by simply inverting the mold and allowing the pieces to fall therefrom. With most of the mold coatings in use at present, it is necessary to pry out or at least jar the pieces loose from the mold surface.

A mold coating composition in which the resins inherent in cork are saponified and utilized as a binder may be produced by mixing together 196 parts by weight of water and 6 parts by weight of ammonia. To each volume of the above described mixture is added ½ part by volume of 80 to dust cork. The material is sprayed upon the mold surface in the usual manner. The water and ammonia form a dilute alkaline solution which reacts with the resins in the cork to form a resin soap.

The mold may be heated to drive off the water and exude the resins so that an effective resin soap bond is formed. The temperature is preferably high enough to cause charring of the cork. This may be accomplished by heating the mold to about 750° F. With this resin soap binder for the cork coating I have been able to produce many mold pieces without destroying the coating. It is well within the realm of possibility to mold 100 pieces with the application of a single coating.

A mold coating composition in the form of a dry mixture for convenient transportation may be prepared by mixing together the following ingredients:

60 grams casein
20 grams sodium phosphate
10 grams sodium sulphite
30 grams lime
100 c.c. 80 to dust cork.

This mixture may be readily prepared for use by adding water. To produce a sprayable solution about 160 grams of water should be added to the above mixture. The amount of water added will, of course, determine the fluidity of the solution and if the coating composition is to be applied with a brush a somewhat less fluid composition will be found desirable.

I have found it advantageous to stir together about equal parts by weight of water and the above mix and after complete mixing to allow the mass to lie dormant for a period of about 15 minutes to one-half hour, which permits the casein to swell. Additional water is then added to form a mixture of the desired fluidity. If desired, the cork may be introduced into the swelled casein composition when the additional water is added. I prefer, however, to form the dry mix including the cork and thereafter add water to form a solution suitable for application to the mold surface.

In place of sodium sulphite in the above mixture, I may substitute ammonium carbonate. The alkaline nature of the casein composition causes a reaction with the resin in the cork whereby a resin soap is formed. This resin soap, in combination with the casein, serves as a binder for securing the cork coating to the surface of the mold. The resin is readily liberated under heat and if the coated mold is placed in an oven heated to about 750° F., the resins are exuded, the water driven off, and the cork carbonized. This results in a smooth coating formed of carbonized cork granules firmly secured to the mold surface.

The mold coatings produced according to my invention are particularly suited for fine pattern work where the surface of the object to be molded is intricate. The molded pieces are readily removed from the mold when my coatings are applied and it has been found that many moldings may be made with a single application of my coating composition. The material is clean and easy to work and lends itself to line production where rapid application is essential. I have found that the molten metal flows rapidly and quite readily over the coated mold and readily enters any minor interstices in the mold. Thus I am able to produce complicated molded pieces having intricate contour.

I have disclosed heating of the mold in an oven to cause carbonization of the cork. The carbonization may be effected in other ways, however. For example, the cork may be carbonized by pouring molten metal thereover, or the mold may be first heated and the coating applied while the mold is still hot enough to carbonize the cork.

When metals having a melting point higher than the carbonization point of cork are to be molded it will be found desirable to simply pour the molten metal into the coated mold and thereby carbonize the cork.

In place of cork, I may employ any filler which possesses an adhesive resin, such for example as redwood bark or the like. When casein is used as the binder it is not so essential that the filler contain adhesive resin, although a superior bond is obtained when cork or other resin bearing filler is employed. The granulation of the cork depends to some extent upon the size and shape of the mold. In some instances cork ground as course as 50 to dust may be found desirable, or on the other hand 200 to dust will be satisfactory for fine mold work on small pieces.

While I have described certain preferred embodiments of my invention, it will be understood that the invention may be otherwise embodied, and practiced within the scope of the following claims.

I claim:

1. In combination, a molding surface and finely comminuted carbonized cork bonded thereto by resinous material of the cork.

2. In combination, a metal molding surface and finely comminuted carbonized cork bonded thereto by resinous material of the cork.

3. In combination, a metal molding surface and finely comminuted carbonized cork bonded thereto by resinous material of the cork and substantially free from hygroscopic materials.

4. In combination, a molding surface and finely comminuted carbonized cork bonded thereto by saponified resinous material of the cork and substantially free from hygroscopic materials.

5. In combination, a molding surface and finely comminuted carbonized cork bonded thereto by saponified resinous material of the cork and an additional adhesive, and substantially free from hygroscopic materials.

6. In combination, a molding surface and finely comminuted carbonized cork bonded thereto by saponified resinous material of the cork and casein, and substantially free from hygroscopic materials.

7. In combination, a molding surface and finely comminuted carbonized cork bonded thereto by an adhesive comprising resinous material of the cork, casein and an alkali.

8. A carbonaceous coating composition for metal molding surfaces and for securement thereto by development of natural resins inherent in the carbonaceous material, comprising cork comminuted to substantially finer than required to pass through an 80 mesh to the inch screen, and a watery vehicle having an amount of water present at least substantially equal to the volume of cork, which vehicle contains sufficient ammonia to render it alkaline.

9. In combination, a metal molding surface and finely comminuted carbonized vegetable matter of a woody nature and containing adhesive resin bonded thereto by resinous material inherent therein.

10. In combination, a metal molding surface and finely comminuted carbonized redwood bark bonded thereto by resinous material inherent therein.

11. In the method of forming a carbonaceous coating on a molding surface the steps consisting in forming a thin suspension of finely comminuted resin bearing vegetable matter of a woody nature and containing adhesive resin in a watery vehicle, applying said suspension to the molding surface to be coated, evaporating the water and heating the surface sufficiently to carbonize the vegetable matter and exude the resin, whereby the carbonized particles are bonded to the molding surface.

12. In the method of forming a carbonaceous coating on a molding surface the steps consisting in forming a thin suspension of finely comminuted cork in a watery vehicle, applying said suspension to the molding surface to be coated, evaporating the water and heating the surface sufficiently to carbonize the cork and exude the resin inherent therein, whereby the carbonized particles are bonded to the molding surface.

13. In the method of forming a carbonaceous coating on a molding surface the steps consisting in forming a thin suspension of finely comminuted cork in a watery vehicle containing sufficient alkaline material to saponify at least a portion of the resin in the suspended cork, applying said suspension to a molding surface, evaporating the water, and heating the surface sufficiently to carbonize the cork and melt the saponified resin, whereby the carbonized cork particles are secured to the molding surface.

14. A carbonaceous coating composition for metal molding surfaces comprising finely comminuted cork, casein and an alkali.

15. A carbonaceous coating composition for metal molding surfaces comprising finely comminuted vegetable matter of a woody nature and containing adhesive resin, casein, lime and a vehicle.

16. A carbonaceous coating composition for metal molding surfaces comprising cork comminuted to substantially finer than 50 mesh, casein, sodium phosphate, sodium sulphite, lime and a vehicle.

17. A carbonaceous coating composition for metal molding surfaces comprising cork comminuted to substantially finer than 50 mesh, casein and lime.

In testimony whereof I have hereunto set my hand.

EDWARD CORNELL EMANUEL.